May 20, 1924.
W. H. THIEMER
UNIVERSAL JOINT
Filed May 14, 1921
1,494,645
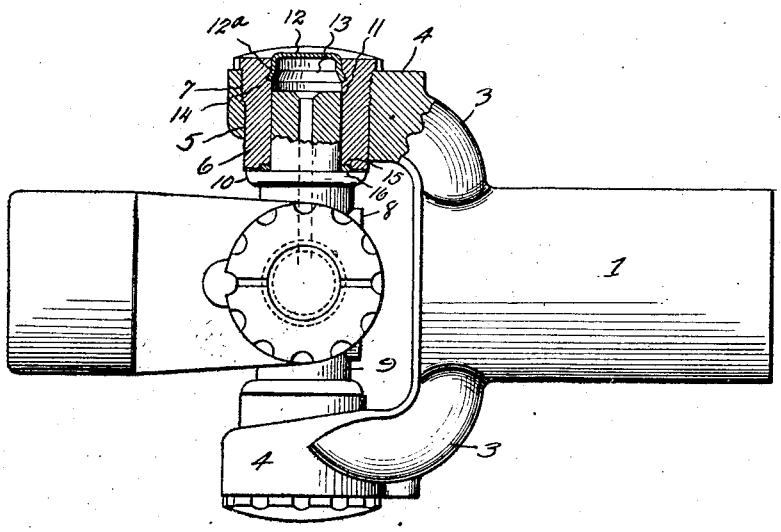

Patented May 20, 1924.

1,494,645

UNITED STATES PATENT OFFICE.

WILLIAM H. THIEMER, OF CLEVELAND, OHIO, ASSIGNOR TO HIMSELF, FREDERICK W. PETERS, AND J. H. WILLS, ALL OF CLEVELAND, OHIO.

UNIVERSAL JOINT.

Application filed May 14, 1921. Serial No. 469,507.

*To all whom it may concern:*

Be it known that I, WILLIAM H. THIEMER, a citizen of the United States, residing at Cleveland, in the county of Cuyahoga and State of Ohio, have invented a certain new and useful Improvement in Universal Joints, of which the following is a full, clear, and exact description, reference being had to the accompanying drawings.

This invention relates to universal joints, and more particularly to means for lubricating the trunnions of such joints. The general object of the invention is to provide a simple and efficient means for providing lubricant wells beyond the outer ends of the trunnions of such joints.

In the drawings, the figure represents a sectional side elevation of a joint constructed in accordance with my invention.

Describing the parts by reference characters, 1 and 2 denote a pair of hubs adapted to be applied to the opposed ends of shaft sections, each hub carrying a yoke comprising a pair of arms 3, each arm having formed therewith a bearing block 4.

Each hub is shown as formed integrally with the yoke arms, and the bearing blocks for each yoke are provided each with a bore 5 for a bearing bushing 6.

The arms 3 project nearly parallel in the direction of the hub, the arms being symmetrical, whereby the bores 5 may be formed by line-reaming both arms. That is to say, the journal holes in the arms may be bored by a single and continuous operation of a single reamer or by a double reamer on a single arbor with a suitable pilot or pilots. By line-reaming in this manner, the axes of the bearing bores 5 will be in a true line, thus insuring accuracy of bearing and preventing any thrust of such trunnions against the ends of the bores.

After the bearing blocks have been reamed, the bores will be threaded in their exterior portions, as indicated at 7. The cross is shown as made of one piece and is of the lubricating type, being provided with a central receptacle or well 8 from which there project cross arms 9, each having an inwardly rounded shoulder 10 and a reduced hollow trunnion 11. Each trunnion is mounted within a bearing bushing 6, each having at its outer end a cap 12 forming with the portion of the bearing beyond the trunnion a well 13 for lubricant supplied from the central well 8 through the hollow arms 9.

The bore of the bushing bearing 6 is provided with a frusto-conical recess 14 projecting outwardly therefrom. The cap 12 is formed with an annular flange. When the cap has been inserted within the outer end of the bushing bore the inner end of the flange or skirt 12ª is expanded outwardly by a suitable tool into the seat 14 provided therefor, thus locking the cap 12 in place.

At the inner end of each bushing bearing, there is provided an annular recess 15 forming a seat for a washer 16, which may be of ground cork, the washer being of a thickness to bear against the outer face of the shoulder 10.

In the operation of the device, oil will be thrown outwardly by centrifugal action from the well 8 into the wells 12, and from said wells will be distributed to the bearings 4 between the trunnions and their respective bushing bearings.

Having thus described my invention, what I claim is:

1. In a universal joint, the combination of a pair of hubs each having arms projecting therefrom, each arm having a bore therethrough and a bushing mounted in such bore, each bushing having a central bore extending therethrough and each having an outwardly tapering recess surrounding the outer portion of such bore and communicating therewith, a cap for each bore and each having a flange, each flange having its end flared or expanded outwardly into locking engagement with the recess for its bore, and a cross member having a central chamber for lubricant and provided with hollow trunnions mounted in said bushings.

2. In a universal joint the combination of a bearing having a bore extending therethrough and an outwardly tapering recess surrounding the outer portion of such bore and communicating therewith, a cap for such bore having a flange flared or expanded outwardly into locking engagement with the said recess, and a connecting member having a central chamber for lubricant and provided with a hollow trunnion mounted in said bore.

3. A bushing for the trunnions of universal joints having a bore extending from the inner end through the outer end thereof, a frusto-conical recess projecting outwardly from and surrounding such bore, and a cap mounted in the outer end of such bore and having an inwardly extending flange with its inner end expanded or pressed outwardly into locking engagement with such recess.

In testimony whereof, I hereunto affix my signature.

WILLIAM H. THIEMER.